United States Patent [19]

Roggero et al.

[11] Patent Number: 4,833,211
[45] Date of Patent: May 23, 1989

[54] PROCESS FOR THE PREPARATION OF SOLID POLYMERIC STABILIZER COMPOUNDS

[75] Inventors: Arnaldo Roggero; Mario Clerici, both of Milan; Guglielmo Bertolini, Pavia, all of Italy

[73] Assignees: Eniricherche S.p.A., Milan; Enichem Sintesi S.p.A., Palermo, both of Italy

[21] Appl. No.: 19,881

[22] Filed: Feb. 27, 1987

[30] Foreign Application Priority Data

Mar. 7, 1986 [IT] Italy ................................ 19670 A/86

[51] Int. Cl.$^4$ .............................................. C08F 12/08
[52] U.S. Cl. ................................ 525/333.3; 525/359.4; 526/313
[58] Field of Search .................... 525/333.3, 359.4; 526/313

[56] References Cited

FOREIGN PATENT DOCUMENTS 0202878 10/1983 German Democratic Rep. .................................. 525/359.4

Primary Examiner—Joseph L. Schofer
Assistant Examiner—Peter Mulcahy
Attorney, Agent, or Firm—Hedman, Gibson, Costigan & Hoare

[57] ABSTRACT

Solid polymeric stabilizer compound containing the hydroxybenzophenone function, having the general formula (I):

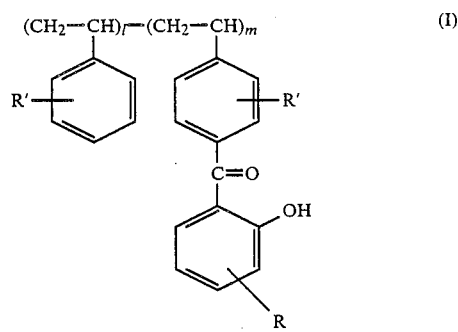

wherein:
  $m$ = from 0.01 to 0.99 (preferably from 0.1 to 0.6);
  $l$ = from 0.99 to 0.01 (preferably from 0.9 to 0.4):
  $m + l = 1$;
  R = H, —OH, —OR" (R" + ($C_1$-$C_{20}$)-alkyl; aryl, alkylaryl cycloalkyl). halogen, ($C_1$-$C_{20}$)-alkyl, cycloalkyl;
  R' = H, ($C_1$-$C_{20}$)-alkyl, cycloalkyl.

Also the process for preparing said solid polymeric stabilizers and the stabilized polymeric compositions comprising at least an organic polymer and a stabilizing amount of said solid polymeric stabilizers are disclosed.

8 Claims, 1 Drawing Sheet

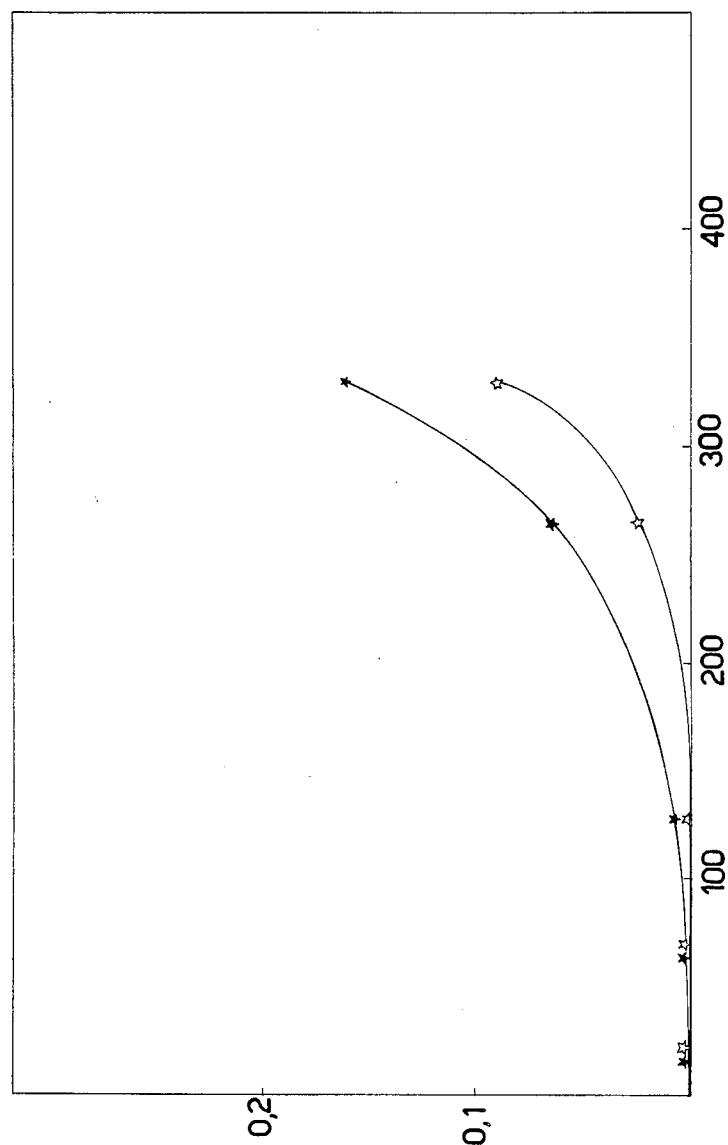

PROCESS FOR THE PREPARATION OF SOLID POLYMERIC STABILIZER COMPOUNDS

The present invention relates to polymeric stabilizer compounds containing the U.V. absorber function on the basis of hydroxyphenone, to the processes for their preparation and to the stabilized polymeric compositions which comprise an organic polymer and a stabilizer amount of said solid polymeric stabilizer compounds.

The organic polymers, such as, e.g., polystyrene, the polyolefins and polydienes, are prone to degradation over time due to the effect of the exposure to the atmospheric agents, and, in particular, due to the action of U.V. light.

This degradation has an influence, unfortunately in an irreversible way, the characteristics of the polymers, and, in particular, their technological properties; e.g., a drop in ultimate strength and in flexibility is experienced, which is accompanied by a change in meltflow index.

To prevent such a degradation, usually small amounts of U.V. absorber compounds are added.

Such U.V. absorbers are generally selected from hydroxybenzophenone, and its alkoxy-derivatives and hydroxyphenylbenzotriazoles.

For example, the derivative 4-octoxy-2-hydroxybenzophenone is known to stabilize several polymeric substrates, with particular regard for the polyolefinic ones [Pouncy H. W., Mod. Plast. 62 (3), 68 70 72 (1985); Gugumus F. L., Polym. Sci. Technol. (Plenum) 26 (Polym. Addit.), 17-33 (1984)].

The problems to be faced in the stabilization of the organic polymers derive basically from phenomena of incompatibility between the organic polymer and the stabilizer, and from phenomena of stabilizer release by the same polymer. In the stabilization by means of the stabilizers of the prior art, these undesirable phenomena occur to different extents, and as a consequence the need was strongly felt of having available compounds compatible with the organic compounds, and able to remain more stably inside the same polymers.

In the technical literature, trials are reported of polymeric compounds containing the U.V. absorber function on the basis of hydroxybenzophenone through extremely complex procedures (multi-step reactions), which led to impurities-containing compounds, and have shown poor yields.

For example, the synthesis is reported of a polymer having the general formula (II):

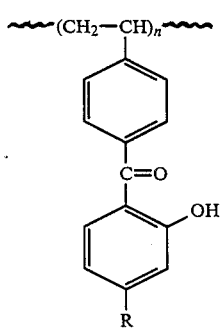

(II)

(wherein R=—H, —OH, —OR', wherein R' is an alkyl and n=74–450), obtained by a process comprising the following steps:

(i) Synthesis of

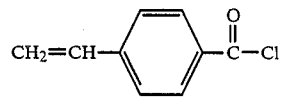

by a 6-steps process [J. R. Leebrick, H. E. Ramsden; J. Org. Chem. 23, 935 (1958)];

(ii) Reaction of

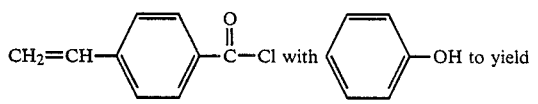

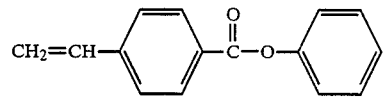

(iii) Free-radical initiated polymerization;

(iv) FRIES rearrangement catalyzed by acidic means, to yield only small aliquots of polymer of general formula (II).

[C. Pinazzi, A. Fernandez, Mak. Chem. 177, 3089 (1976)]; or by the following process, consisting of the following steps:

(i) Synthesis of

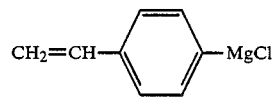

[J. Org. Chem., 23, 935 (1958)].

(ii) Reaction of

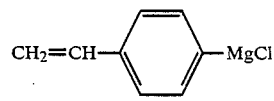

with

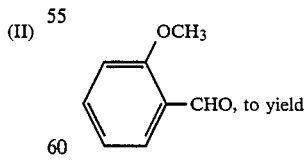

to yield

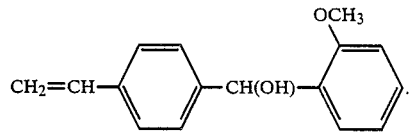

(ii) Oxydation of

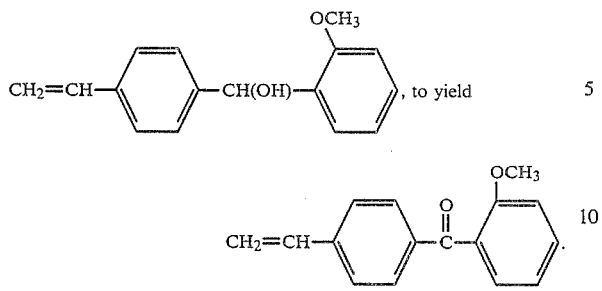, to yield

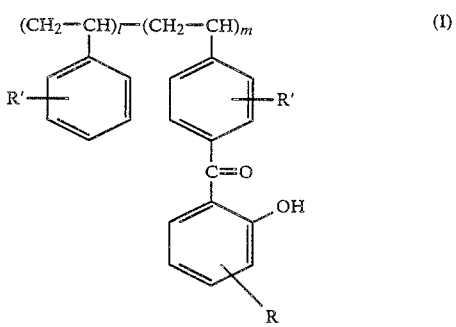

(iv) Free-radical initiated polymerization;

(v) Liberation of —OCH$_3$ function to yield —OH by acidic means

[C. Pinazzi, A. Fernandez, Mak. Chem. 167, 147 (1973); ibid., 168, 19 (1973)].

However, these processes show the following disadvantages:

Low yields of product (II), containing as impurity the product containing the —OH group in the para position relatively to the carbonyl group, which is not a product active in the stabilization process. (First process)

Extremely extensive chain breakages occur in step (v). (Second process)

Multi-step process, with low yields to desired product.

The present Applicant has found now that the products containing the U.V. absorber function of hydroxybenzophenone type can be obtained by means of an extremely simplified process, and in a very high purity, according to a scheme which is disclosed in detail hereunder.

The present invention is based on the observation that the aromatic functions containing polymers can be easily submitted to a Friedel-Crafts reaction for a functionalization by the group

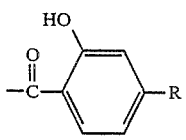

(wherein R=as per following disclosure) by starting from the suitable aromatic product and from the salicilic acid chloride and/or from its derivatives, according to a very easily accomplishable reaction, consisting of one step only, giving high yields into an extremely high-purity functionalized product, and offering the possibility of having different functionalization degrees.

It results thus possible to produce, in a simple and convenient way, solid polymeric stabilizer compounds containing the desired amount of hydroxybenzophenone function, in such a physical form as to be easily homogenized with the organic polymers, which, on one hand, maintain unchanged the stabilizing characteristics typical of hydroxybenzophenones, and, on the other hand, display extremely good characteristics of compatibility and of permanence inside the organic polymers.

Thus, a first object of the present invention is a solid polymeric stabilizer compound containing the hydroxybenzophenone function, having the general formula (I):

wherein:
m=from 0.01 to 0.99 (preferably from 0.1 to 0.6);
l=from 0.99 to 0.01 (preferably from 0.9 to 0.4):
m+l=1;
R= —H, —OH, —OR″[R″=(C$_1$-C$_{20}$)-alkyl; aryl, alkylaryl cycloalkyl]. halogen, (C$_1$-C$_{20}$)-alkyl, cycloalkyl;
R′= —H, (C$_1$-C$_{20}$)-alkyl, cycloalkyl.

A second object of the present invention is a process for the synthesis of the solid polymeric stabilizers of formula (I), according to which polystyrene, either as such, or substituted, is acylated with (possibly substituted) o-hydroxybenzoyl chloride (either pure or containing, as impurities, ester or anhydride-type by-products, which can be formed during the chlorination of possibly substituted o-hydroxybenzoic acid).

Polystyrene can be possibly substituted with R′ groups [(C$_1$-C$_{20}$)-alkyl], whilst o-hydroxybenzoyl chloride can be substituted on the aromatic ring with R groups equal to —OH, —OR″ R″=(C$_1$-C$_{20}$)-alkyl, aryl, alkylaryl, cycloalkyl), halogen, (C$_1$-C$_{20}$)-alkyl; cycloalkyl.

The reaction is carried out under such conditions as customary for the Friedel-Crafts reaction (G. A. Olah; Friedel-Crafts and Related Reactions, N.Y. 1963).

The reaction is carried out with the usual Friedel-Crafts catalysts, such as, e.g., AlCl$_3$, BF$_3$, SbCl$_5$, TiCl$_4$, FeCl$_3$, ZnCl$_2$.

AlCl$_3$ and BF$_3$ show to be very suitable.

To avoid such drawbacks as the polymer crosslinking and degradation, the reaction should be preferably carried out with a slight excess of Friedel-Crafts catalyst.

The reaction time has to be adjusted as a function of the temperature and of the catalyst/acyl chloride ratio.

Among the classic solvents for the Friedel-Crafts reaction, those able to dissolve the reactants, in particular chlorobenzene, dichlorobenzene and nitrobenzene, should be selected.

The polystyrene used has a molecular weight comprised within the range of from 500 to 200,000 (preferably of from 2,000 to 50,000).

The acyl chloride used can be also substituted on its aromatic ring with —OH, alkoxy, halogen or alkyl.

The preferred acyl chloride is salicilic acid chloride. This latter is obtained by chlorinating salicilic acid by a suitable chlorinating agent, such as oxalyl chloride [L. H. Ulich, R, Adams; J. Am. Chem. Soc., 42, 604 (1920)], or thionyl chloride [L. Mc. Master, FF. Ahnan, J. Am. Chem. Soc., 50, 148 (1928)].

Between the above two agents, the second one is more convenient, although the reaction must be carried out under controlled conditions, to the purpose of preventing the formation of several byproducts, which interfere in the subsequent condensation.

A solvent may be used or not, and using a stoichiometric amount, or a slight excess of thionyl chloride is preferable.

The reaction time should be controlled, above all if an excess of chlorinating agent is used, in order to prevent noxious byproducts from forming.

The acylating reaction can be carried out, besides on polystyrene, also on polymers containing aromatic groups, also of condensed type inside the molecule.

Such a product may also be considered as a stabilized polymeric composition. The stabilized polymeric compositions of the present invention comprise an organic polymer, and such an amount of said solid polymeric stabilizer compound as to supply the composition with an hydroxybenzophenone concentration of not less than 1-2% by weight.

By operating as indicated above, obtaining solid polymeric stabilizers is possible, which can be easily homogenized, by simple mixing, with the organic polymer powders to be stabilized.

These solid polymeric stabilizers are moreover endowed with an exceptionally high thermal stability and very good characteristics of compatibility with the organic polymers, in particular when the organic polymer has a similar nature to the basic polymer used in the preparation of the polymeric stabilizer. Finally, the solid polymeric stabilizers of the present invention do not show any tendency to be extracted from the organic polymers inside which they are incorporated, as it shall clearly result from the experimental Examples.

By means of the solid polymeric stabilizers of the present invention, such organic polymers can be stabilized, as polyolefins, polydiolefins, copolymers of monoolefins and diolefins, polystyrenes, copolymers of dienes and vinylaromatics, polyphenyleneoxides, polyphenylenesulphides, polyurethanes, polyamides and copolyamides, polyureas, polyimides and polyamide-imides, polyesters, polycarbonates, polysulphones and polyestersulphones, unsaturated polyesters, natural polymers (rubber), in general, also such compounds as lubricant oils.

Therefore, according to a further aspect, the present invention relates to stabilized compositions comprising an organic polymer and a stabilizer amount of said solid polymeric stabilizers. By the term "stabilizer amount", that amount is meant, which secures the presence in the composition of an amount of active compound of from 0.005 to 0.02% by weight, and preferably of the order of 0.015% by weight.

According to the preferred form of practical embodiment of the present invention, in these stabilized compositions the average molecular weight of the solid polymeric stabilizer is lower than the average molecular weight of the organic polymer.

The stabilized polymeric compositions of the present invention can be prepared by any known techniques used to homogenize an organic polymer with the stabilizer agent. In the preferred form of practical embodiment, a simple mixing is carried out of the organic polymer powder and of the solid polymeric stabilizer.

The following experimental Examples are illustrative and not limitative of the invention.

EXAMPLE 1

An amount of 18 g of salicilic acid is suspended in 100 cc of anhydrous chloroform and 15 cc of thionyl chloride, under nitrogen. The whole is refluxed for 3 hours and then the solvent and the excess of thionyl chloride are removed under vacuum. The residual viscous liquid is dissolved in 300 cc of anhydrous chlorobenzene, then to the resulting solution aluminum chloride (20 g) is added portionwise. Lastly, polystyrene (m.w. 20,000, 27 g) in 120 cc of chlorobenzene is added, and temperature is increased to 60° C. for three hours.

At reaction end, the suspension is cooled and is then poured into 0.5 l of $H_2O$ and ice, with acidification by hydrochloric acid. The organic portion is exhaustively extracted with ethyl acetate, the ethyl acetate solutions are combined, water-washed to neutral pH and are then dried over anhydrous sodium sulphate.

After sodium sulphate being filtered off, the solution is concentrated and the product is then precipitated with methanol.

The slightly yellow-coloured solid obtained is washed and then exhaustively dried under vacuum at 60° C. (25 g). This product (MGC 1065/B) shows, as compared with the commercial product Chimassorb ® 81 a considerably higher stability, as reported in Table 1.

TABLE 1

| | ΔT(35-230° C.) Weight Loss % | ΔT(230-280° C.) Weight Loss % | ΔT(+395° C.) Weight Loss % |
|---|---|---|---|
| CHIMASSORB ® 81 | 1.7 | 6.50 | 99.7 |
| 1065/B | 0.7 | 0.24 | 8.4 |

The I.R. spectrum shows two very intense absorption peaks at 1605 and 1625, in accordance with the presence of one o-hydroxybenzophenone group [L. J. Bellamy, The Infrared Spectra of Complex Molecules, Vol. I, $3^{rd}$ Ed., London, 1975].

The N.M.R. spectrum is consistent with the proposed structure and shows that the m/m+1 ratio is about 0.4.

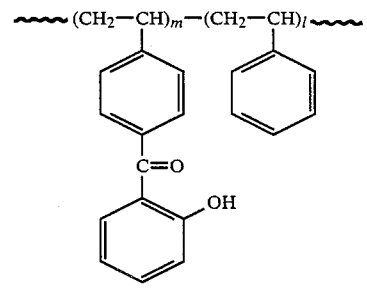

DESCRIPTION OF THE DRAWING

In FIGURE 1, the trend is shown of the carbonyl index (as the ordinate) [Polymer Degradation and Stability 2, 179 (1980)] as a function of the treatment time in UVCON (ATLAS) (time as the abscissae as hours), of a typical polystyrene stabilized with the commercial product Chimassorb ® 81 (*) and with the polymer obtained in the present Example (*), which, clearly, shows a decidedly higher stabilizer effect.

The test conditions are:
U.V. = 280 to 350 nm;
Irradiation cycles: 8 hrs at 60° C.;
Condensation cycles in the darkness: 4 hrs at 40° C.

EXAMPLE 2

16.5 g of salicylic acid is treated with 9.1 g of thionyl chloride in 50 cc of anhydrous chloroform, plus one drop of pyridine. The whole is heated for 50 minutes and the excess of solvent is evaporated off under vacuum. The residue is redissolved in 200 cc of chlorobenzene and treated with 17.2 g of AlCl$_3$.

To the so-obtained yellow suspension, the polystyrene (22 g, m.w. 10,000), dissolved in 300 cc of chlorobenzene, is added. The mixture is heated 5 hours at 70° C. and is then cooled and hydrolyzed in water and ice (pH=about 0). 300 cc of methylene chloride is added, and the organic phase is separated, water-washed to neutral pH and dried over anhydrous Na$_2$SO$_4$. The organic phase is concentrated under vacuum, and the polymer is precipitated with methanol.

The slightly yellow-coloured solid is filtered off, washed with methanol and dried under vacuum at 60° C. (23 g).

The spectrum characteristics are similar to those of Example 1, with an m/m+1 reatio=0.22.

EXAMPLE 3

After o-hydroxybenzoyl chloride being synthetized, by starting from 8.2 g of salicylic acid and by the procedure of Example 2, it is dissolved in 100 cc of chlorobenzene. To this solution, 4.3 g of BF$_3$ gas and 11 g of polystyrene (m.w. 5,000), dissolved in 200 cc of chlorobenzene, are added. The mixture is kept stirred at 30° C. for 6 hours and is then hydrolyzed with water and ice. The organic portion is extracted with methylene chloride; the organic extracts are water-washed to neutral pH, dried over sodium sulphate and then concentrated under vacuum.

The polymer is precipitated by the addition of methanol, is filtered off, washed with methanol and dried under vacuum at 60° C. (10 g). Its spectrum characteristics are similar to those of Example 1, with an m/m+1 ratio=0.3.

EXAMPLE 4

8 g of 2-hydroxy-4-methoxybenzoic acid is chlorinated with 3.7 g of thionyl chloride in 25 cc of chloroform and a trace amount of pyridine. After the solvent being evaporated off, the acyl chloride is diluted again with 50 cc of nitrobenzene, 6.6 g of AlCl$_3$ and then 10 g of polystyrene (m.w. 10,000), dissolved in 100 cc of anhydrous nitrobenzene, are added. The mixture is heated 4 hours at 50° C. with stirring, and is then hydrolyzed with water and ice at pH 0. The organic portion is extracted with methylene chloride and, after the usual treatments, 9.5 g of polymer is obtained.

The analysis by I.R. and N.M.R. evidences the following structure:

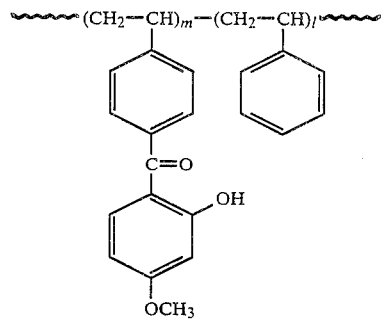

with m/m+1=0.45. The cleavage of methoxy group in the 4-position by demethylation results negligible.

EXAMPLE 5

2 g of polymer prepared as in Example 1 and 1.8 g of AlCl$_3$ are separately dissolved, each in 20 cc of anhydrous nitrobenzene. To the AlCl$_3$ solution, added are firstly 4 g of dodecene-1, and then the polymer solution, with strong stirring.

After 2 hours at 40° C., the mixture is hydrolyzed at 0° C. with water and hydrochloric acid (pH=about 0), and is then diluted with an excess of methanol. The precipitate is separated and purified by being repeatedly precipitated from toluene and methanol.

The product is dried under vacuum at 60° C. for 20 hours.

The I.R. (bands close to 3000 cm$^{-1}$) and N.M.R. analyses show that about 20% of the aromatic nuclei have been alkylated, whilst the o-hydroxybenzophenone function has remained unchanged.

The so-carried out alkylation demonstrates to be useful in improving the compatibility of the stabilizer with non-aromatic polymers.

We claim:

1. A process for the production of solid UV-stabilizing compounds which include a hydroxybenzophenone moiety and which exhibit excellent compatibility with organic polymers having the general formula (I):

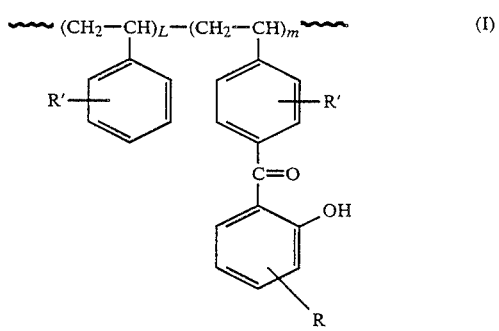

wherein:
m=from .0.01 to 0.99 (preferably from 0.1 to 0.6);
L=from 0.99 to 0.01 (preferably from 0.9 to 0.4);
m+L=1;
R=—H, —OH, —OR″(R″=(C$_1$-C$_{20}$)-alkyl; aryl, alkylaryl cycloalkyl), halogen, (C$_1$-C$_{20}$)-alkyl, cycloalkyl; and
R′=H, (C$_1$-C$_{20}$)-alkyl, cycloalkyl, comprising acylating a substituted or unsubstituted polystyrene with substituted or unsubstituted o-hydroxybenzoyl chloride in the presence of a Freidel-Crafts catalyst.

2. The process according to claim 1, wherein the polystyrene is substituted with alkyl groups containing from 1 to 20 carbon atoms or with cycloalkyl groups.

3. The process according to claim 1, wherein the o-hydroxybenzoyl chloride is substituted on the aromatic ring with —OH, —OR″(R″=($C_1$-$C_{20}$)-alkyl groups, aryl, alkylaryl, cycloalkyl), halogen, ($C_1$-$C_{20}$)-alkyl or cycloalkyl.

4. The process according to claim 1, wherein the catalyst is selected from the group consisting of $AlCl_3$, $BF_3$, $SbCl_5$, $TiCl_4$, $FeCl_3$ and $ZnCl_2$.

5. The process according to claim 1, further comprising carrying out the acylation in the presence of a suitable solvent.

6. The process according to claim 5, wherein the solvent is selected from the group consisting of chlorobenzene, dichlorobenzene and nitrobenezene.

7. The process according to claim 1, further comprising mixing the solid polymeric stabilizing compound with an organic polymer, said solid polymeric stabilizing compound being supplied in not less than 2% by weight of the total composition, the average molecular weight of said polymeric stabilizing compound being lower than the average molecular weight of said organic polymer.

8. The process according to claim 7, wherein the organic polymer is a polymer of polyolefins, polydiolefins, copolymers of monoolefins and diolefins, polystyrenes, copolymers of dienes and vinylaromatics, polyphenyleneoxides, polyphenylenesulphides, polyurethanes, polymides and copolyamides, polyureas, polyimides and polyamide-imides, polyesters, polycarbonates, polysulphones and polyester-sulphones, unsaturated polyesters, and natural polymers (rubber).

* * * * *